United States Patent
Iyengar et al.

(10) Patent No.: US 9,448,799 B2
(45) Date of Patent: *Sep. 20, 2016

(54) REORDER-BUFFER-BASED DYNAMIC CHECKPOINTING FOR RENAME TABLE REBUILDING

(71) Applicant: Samsung Electronics Co., Ltd., Suwon-si, Gyeonggi-do (KR)

(72) Inventors: Ravi Iyengar, Austin, TX (US); Prarthna Santhanakrishnan, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 525 days.

This patent is subject to a terminal disclaimer.

(21) Appl. No.: 13/831,488

(22) Filed: Mar. 14, 2013

(65) Prior Publication Data

US 2014/0281414 A1    Sep. 18, 2014

(51) Int. Cl.
G06F 9/30 (2006.01)
G06F 9/38 (2006.01)

(52) U.S. Cl.
CPC .......... *G06F 9/30098* (2013.01); *G06F 9/384* (2013.01); *G06F 9/3855* (2013.01); *G06F 9/3863* (2013.01)

(58) Field of Classification Search
CPC . G06F 9/30098; G06F 9/3855; G06F 9/3863
See application file for complete search history.

(56) References Cited

U.S. PATENT DOCUMENTS

| | | | |
|---|---|---|---|
| 5,630,149 A * | 5/1997 | Bluhm | 712/217 |
| 5,822,574 A * | 10/1998 | Tran | G06F 9/30036 712/215 |
| 6,349,361 B1 | 2/2002 | Altman et al. | |
| 7,017,026 B2 | 3/2006 | Yoaz et al. | |
| 7,603,497 B2 | 10/2009 | Mack et al. | |
| 7,711,932 B2 | 5/2010 | Akkary et al. | |
| 7,747,841 B2 * | 6/2010 | Martinez et al. | 712/218 |
| 7,809,926 B2 | 10/2010 | Martinez et al. | |
| 7,975,129 B2 | 7/2011 | Raikin et al. | |
| 8,301,849 B2 | 10/2012 | Rajwar et al. | |
| 2004/0189660 A1 * | 9/2004 | Marion et al. | 345/601 |
| 2006/0149931 A1 | 7/2006 | Haitham et al. | |
| 2007/0043934 A1 * | 2/2007 | Sodani | G06F 9/3863 712/228 |
| 2009/0316698 A1 | 12/2009 | Menten | |

(Continued)

OTHER PUBLICATIONS

Andrew Hilton,"CPROB: Checkpoint Processing with Opportunistic Minimal Recovery", Sep. 18, 2009,Appears in Proccedings of PACT, pp. 1-2.*

*Primary Examiner* — Idriss N Alrobaye
*Assistant Examiner* — Courtney Carmichael-Moody
(74) *Attorney, Agent, or Firm* — Renaissance IP Law Group LLP (57) ABSTRACT

Out-of-order CPUs, devices and methods diminish the time penalty from stalling the pipe to rebuild a rename table, such as due to a misprediction. A microprocessor can include a pipe that has a decoder, a dispatcher, and at least one execution unit. A rename table stores rename data, and a check-point table ("CPT") stores rename data received from the dispatcher. A Re-Order Buffer ("ROB") stores ROB data, and has a dynamic mapping relationship with the CPT. If the rename table is flushed, such as due to a misprediction, the rename table is rebuilt at least in part by concurrent copying of rename data stored in the CPT, in coordination with walking the ROB.

20 Claims, 11 Drawing Sheets

*GENERAL EMBODIMENT*

(56) References Cited

U.S. PATENT DOCUMENTS

| | | |
|---|---|---|
| 2009/0327661 A1 | 12/2009 | Sperber et al. |
| 2011/0167416 A1 | 7/2011 | Sager et al. |
| 2012/0079245 A1 | 3/2012 | Wang et al. |
| 2012/0079246 A1 | 3/2012 | Breternitz, Jr. et al. |
| 2013/0173885 A1* | 7/2013 | Watanabe et al. ............ 712/205 |
| 2014/0040595 A1* | 2/2014 | Tran ................................ 712/32 |
| 2014/0281393 A1* | 9/2014 | Iyengar et al. ............... 712/208 |
| 2014/0365749 A1* | 12/2014 | Madduri ...................... 712/220 |

* cited by examiner

FIG. 1   *GENERAL EMBODIMENT*

FIG. 2A

*SAMPLE SCENARIO AT NORMAL OPERATION*

FIG. 2B

*SAMPLE SCENARIO AT NORMAL OPERATION*

FIG. 3A  *NORMAL OPERATION*

FIG. 3B  *MISPREDICTION DETECTED*

FIG. 3C  *REBUILDING RENAME TABLE*

FIG. 5

*SAMPLE REBUILD SCENARIO (NO BENEFIT)*

SAMPLE REBUILD SCENARIO
(BENEFIT)

*SAMPLE REBUILD SCENARIO (MOST BENEFIT)*

FIG. 8

FIG. 9     *METHODS*

REORDER-BUFFER-BASED DYNAMIC CHECKPOINTING FOR RENAME TABLE REBUILDING

CROSS-REFERENCE TO RELATED APPLICATIONS

This application may be found to be related to U.S. patent application Ser. No. 13/831,522, filed Mar. 14, 2013, by the same inventors, filed by the same assignee on the same day as the instant application.

BACKGROUND

This disclosure relates to semiconductor devices, and more particularly to microprocessors that control the operation of electronic devices, plus electronic devices that use such microprocessors.

A microprocessor, also known as a Central Processing Unit (CPU), works by executing instructions. Some instructions result in branching points, where one path of execution can be chosen over another. A microprocessor can have increased speed if it makes a correct speculative prediction about which path will be chosen, and executes in advance instructions along that path. Such CPUs are known as out-of-order CPUs. The speed benefit diminishes, however, when there was a misprediction, and recovery is required.

A challenge with out-of-order CPUs is hazards such as Write After Write (WAW) and Write-After-Read (WAR). These hazards are avoided by register renaming, which is accomplished with the help of a rename table that keeps track of the renamed source and destination registers.

A remaining problem, however, is that, anytime there is a mispredicted branch instruction, the rename table has to be entirely flushed. Flushing is a problem because, since the branches can be executed out-of-order, there could be instructions waiting to retire which are older than the mispredicted branch instruction. The rename information for these older instructions has to be rebuilt into the rename table.

The problem, then, manifests itself as delay. During the rebuild process the rename logic has to stall the front end of the pipe from sending new instructions for renaming. This stalling results in delay, which amounts to the penalty for branch misprediction. The penalty depends not only on the rebuild latency, but also on the redirection latency and the depth of the front end of the pipe.

For reducing the stalling, check-pointing schemes have been proposed that are prior to the dispatch stage, as part of the rename pipeline. In those schemes, traditionally each branch instruction starts a new check-point window. This approach is area expensive, since it requires as many check-points as there are in-flight branches allowed in the machine.

BRIEF SUMMARY

The present description gives instances of microprocessors, devices that integrate microprocessors and methods that overcome problems in the prior art.

In one embodiment, a microprocessor includes a pipe that has a decoder, a dispatcher, and at least one execution unit. A rename table stores rename data, and a check-point table ("CPT") stores rename data received from the dispatcher. A Re-Order Buffer ("ROB") stores ROB data, and has a dynamic mapping relationship with the CPT. If the rename table is flushed, such as due to a misprediction, the rename table is rebuilt at least in part by concurrent copying of rename data stored in the CPT, in coordination with walking the ROB.

An advantage over the prior art is that the time penalty from stalling the pipe to rebuild a rename table is diminished. Another advantage arises from the fact that the CPT is after the dispatcher, which drastically reduces the number of check-points required for successfully rebuilding the rename table. The invention results in embodiments that are more efficient in terms of area, power and timing, than pre-dispatch check-point schemes.

These and other features and advantages of this description will become more readily apparent from the following Detailed Description, which proceeds with reference to the drawings, in which:

DETAILED DESCRIPTION

As has been mentioned, the present description is about microprocessors, devices and methods. Embodiments are now described in more detail.

Figure 1:
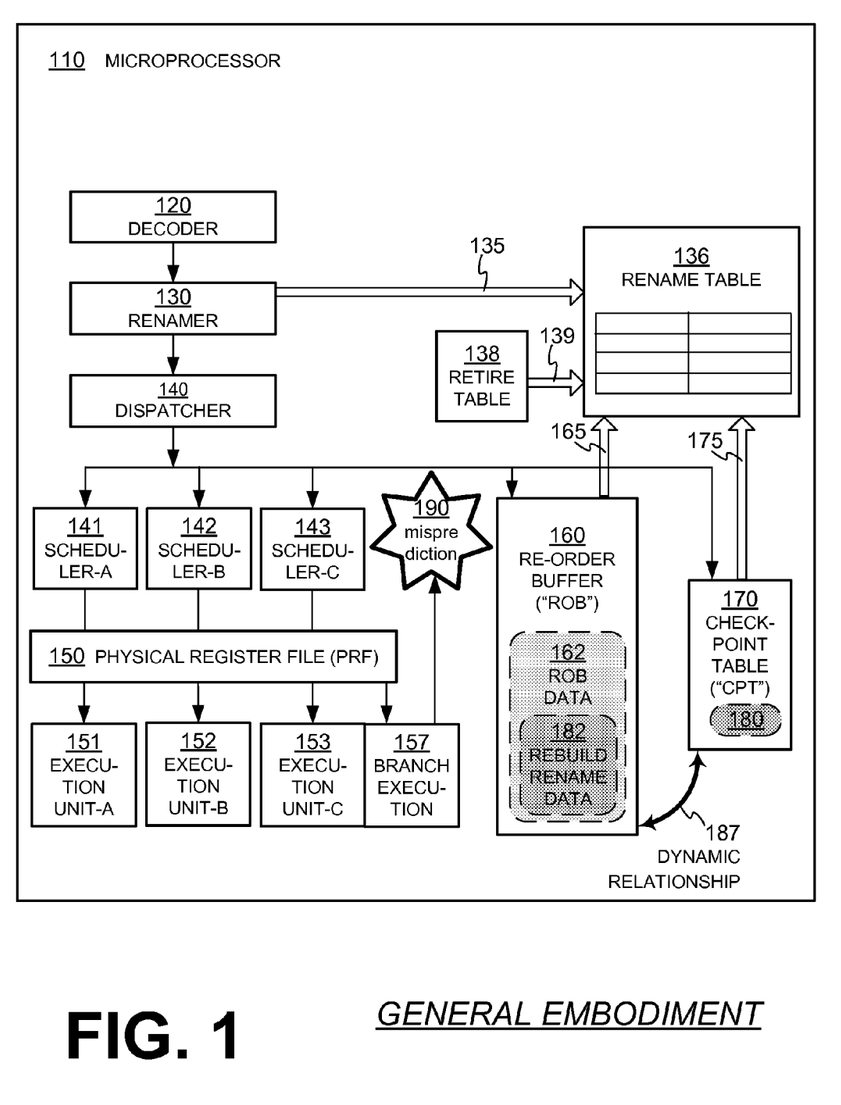
FIG. 1 is a diagram of components of a microprocessor made according to example embodiments.

FIG. 1 is a diagram of components of a microprocessor 110 made according to example embodiments. Microprocessor 110 includes a decoder 120 for receiving instructions, and for decoding these instructions into micro-operations, which are also known as micro-ops.

Microprocessor 110 also includes one or more execution units for executing the micro-ops. In FIG. 1, three execution units are shown, namely Execution Unit-A 151, Execution Unit-B 152 and Execution Unit-C 153, although that number of units is shown by way of example and not of limitation.

Decoder 120 and Units 151, 152, 153 are part of the so-called pipe, which includes additional components. One such component is a dispatcher 140, provided for ultimately dispatching the micro-ops to the execution units. In the example of FIG. 1, dispatching is first to one of three schedulers, namely Scheduler-A 141, Scheduler-B 142, and Scheduler-C 143. The schedulers transmit the micro-ops to execution units 151, 152, 153. These execution units read the sources from a Physical Register File (PRF), and then execute the micro-ops. The person skilled in the art will appreciate that the above are only one sample architecture for this part of the pipe, and different architectures are also possible.

Microprocessor 110 additionally includes a renamer 130, which receives the micro-ops from decoder 120. Renamer 130 generates rename data according to the micro-ops.

Microprocessor 110 moreover includes a rename table 136. Rename table 136 stores the rename data, which it receives from renamer 130 according to arrow 135.

Microprocessor 110 also includes a Re-Order Buffer ("ROB") 160. ROB 160 has ROB entries, which are not shown individually in FIG. 1. As will be seen later in more detail, ROB 160 includes a Retire Pointer and a Flush Pointer, each of which points to a variable one of the ROB entries. ROB 160 may be circular or not. The ROB entries are for storing ROB data 162, which are generated from the micro-ops. In some embodiments, each ROB entry stores one micro-op, although more micro-ops could be stored in a single ROB entry. ROB data 162 includes rebuild rename data 182, which preferably corresponds to rename data stored in rename table 136. In the embodiment if FIG. 1, ROB data 162 is received from dispatcher 140.

Microprocessor 110 further includes at least one check-point table ("CPT") 170. CPT 170 is as wide as rename table 136. CPT 170 has CPT entries, which are not shown individually in FIG. 1. The CPT entries are as many as those of rename table 136, which means that the CPT is as deep as rename table 136. The number of the CPT entries defines the CPT depth. The CPT entries are for storing a check-pointed version 180 of the rename data stored in rename table 136. The check-pointed version 180 of the rename data can be any version that can yield the rename data, or it can be exactly the rename data, in which case it is called check-pointed rename data 180 because it is stored in check-point table 170. In the embodiment if FIG. 1, the check-pointed version 180 of the rename data is received from dispatcher 140.

As will be described in more detail below, the ROB checkpoint window maps into the CPT according to a dynamic relationship 187, where the ROB checkpoint window is defined based on the ROB entry that the Retire Pointer points to. Since the Retire Pointer points to a generally different ROB entry at different times, relationship 187 is therefore variable. As such, when a ROB entry gets allocated with a new micro-op, a selected CPT entry also becomes updated with the destination rename information for that micro-op, if that micro-op has a destination.

As described previously, rename table 136 may be flushed, which more exactly means that the rename data stored in the rename table may be flushed. In the embodiment of FIG. 1, microprocessor 110 also includes branch execution logic 157. Logic 157 can detect a misprediction, shown by flag 190, in executing the micro-ops as per the above. Rename table 136 can be flushed responsive to detecting misprediction 190.

If rename table 136 is flushed, then it can be rebuilt. For purposes of rebuilding, microprocessor 110 may also include a retire table 138, which can store retire check-point data. The retire check-point data can be copied to rename table 136 according to an arrow 139, as the initial part of the rebuilding.

Further for purposes of rebuilding, the flushed rename data can be restored to rename table 136 from two sources of data, in addition to the initial copying from the retire table. First, the check-pointed version 180 of the rename data can be copied as a mass importation from CPT 170 to rename table 136 according to an arrow 175. The mass importation is implemented by concurrent copying, if permitted by an aspect of dynamic relationship 187, as explained later in this document. Second, at least a portion of rebuild rename data 182 within ROB data 162 can be copied from ROB 160 to rename table 136 according to an arrow 165, which is a process otherwise known as "walking the ROB".

Figure 2A:
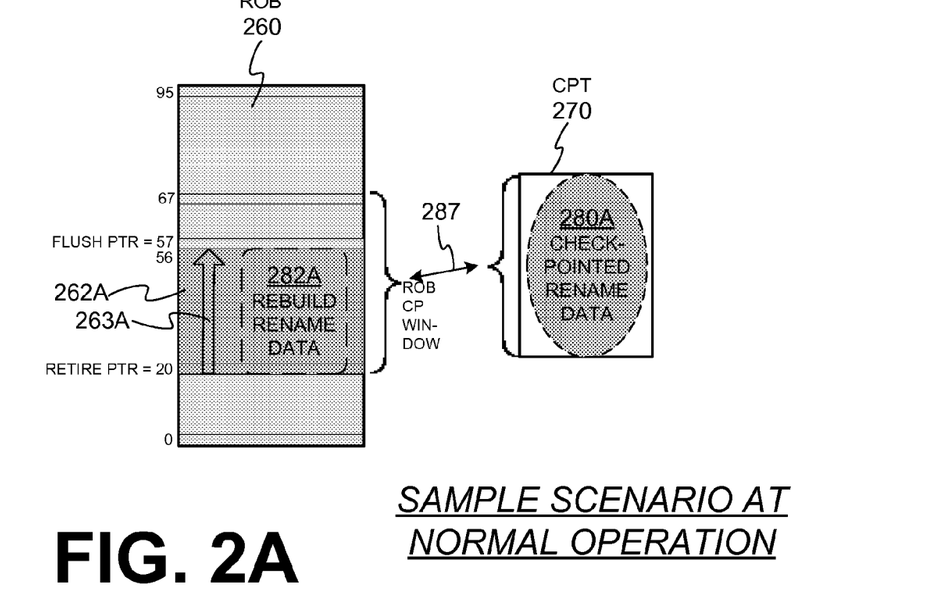
FIGS. 2A, 2B are diagrams that show different operational scenarios of the components in FIG. 1, for illustrating a dynamic relationship according to embodiments.
Figure 2B:
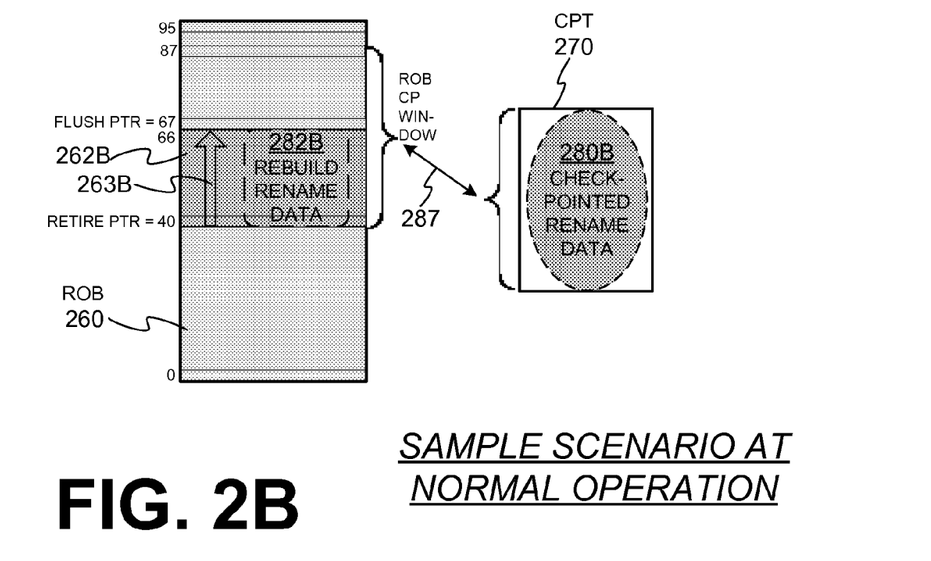

Implementation details are now provided. FIGS. 2A and 2B show a ROB 260 and a CPT 270 that could be substituted in microprocessor 110 of FIG. 1. It will be appreciated that the choices of sizes and functional relationships between ROB 260 and a CPT 270 can be made with a view to favoring rebuilding via the concurrent copying of arrow 175, over the copying of arrow 165, so as to save processor time.

In this example, ROB 260 has 96 ROB entries, named from 0 to 95. ROB 260 could have had any number of ROB entries. In addition, a ROB checkpoint window is defined as having a group of ROB entries. The group can be any number, which can be optimized. A number that works well for the group is about half of the size of the depth of the ROB, in this case 48 ROB entries. As will be understood from the below, a ROB checkpoint window that is too much larger than the optimum will not invoke the CPT enough times to make a good difference, while if it is too much smaller than the optimum it will invoke the CPT enough times, but for not enough rename data. In both cases, if the group size strays too far from the optimum, it will result in walking the ROB more times than is necessary, as will be seen below.

In FIGS. 2A and 2B, ROB 260 and CPT 270 are shown at different scenarios during which the rename table has been flushed. Of course, each time the ROB checkpoint window will span a different group of 48 ROB entries. Plus, the ROB rebuild window each time will generally have a different number of ROB entries, when defined at different times by different events of flushing the rename table.

More particularly, in FIG. 2A, the ROB checkpoint window is defined as starting from Retire Pointer at ROB entry 20, and including up to ROB entry 67. Plus, ROB rebuild window 263A is defined, which encompasses 37 ROB entries, namely ROB entries 20-56, since the one after 56 is 57, the one pointed to by the Flush Pointer. These 37 ROB entries store ROB data 262A, which include rebuild rename data 282A. CPT 270 stores check-pointed rename data 280A.

Moreover, in FIG. 2B, the ROB checkpoint window is defined as starting from Retire Pointer at ROB entry 40, and including up to ROB entry 87. Plus, ROB rebuild window 263B is defined, which encompasses only 27 ROB entries, namely ROB entries 40-66. These 27 ROB entries store ROB data 262B, which includes rebuild rename data 282B. CPT 270 stores check-pointed rename data 280B.

Dynamic relationship 287 is a way of how the ROB, and more particularly the ROB checkpoint window, maps into the CPT. The mapping is sometimes called an association. Relationship 287 is called dynamic because it changes, since the ROB checkpoint window is defined based on the ROB entry that the Retire Pointer points to. Indeed, in FIGS. 2A and 2B the ROB checkpoint window is defined at different places.

For purposes of rebuilding, the option exists that a specific element will be restored to the rename table from either the ROB entry it is stored in, or CPT 270 that it is stored in. If copying from the CPT is permitted, it will be faster.

Dynamic relationship 287 governs in part whether and to what extent rebuilding will be from CPT 270, in addition to from ROB 260. In fact, copying from CPT 270 takes place if otherwise permitted by an aspect of relationship 287. Examples of when that is permitted are described later in this document.

Figure 3A:
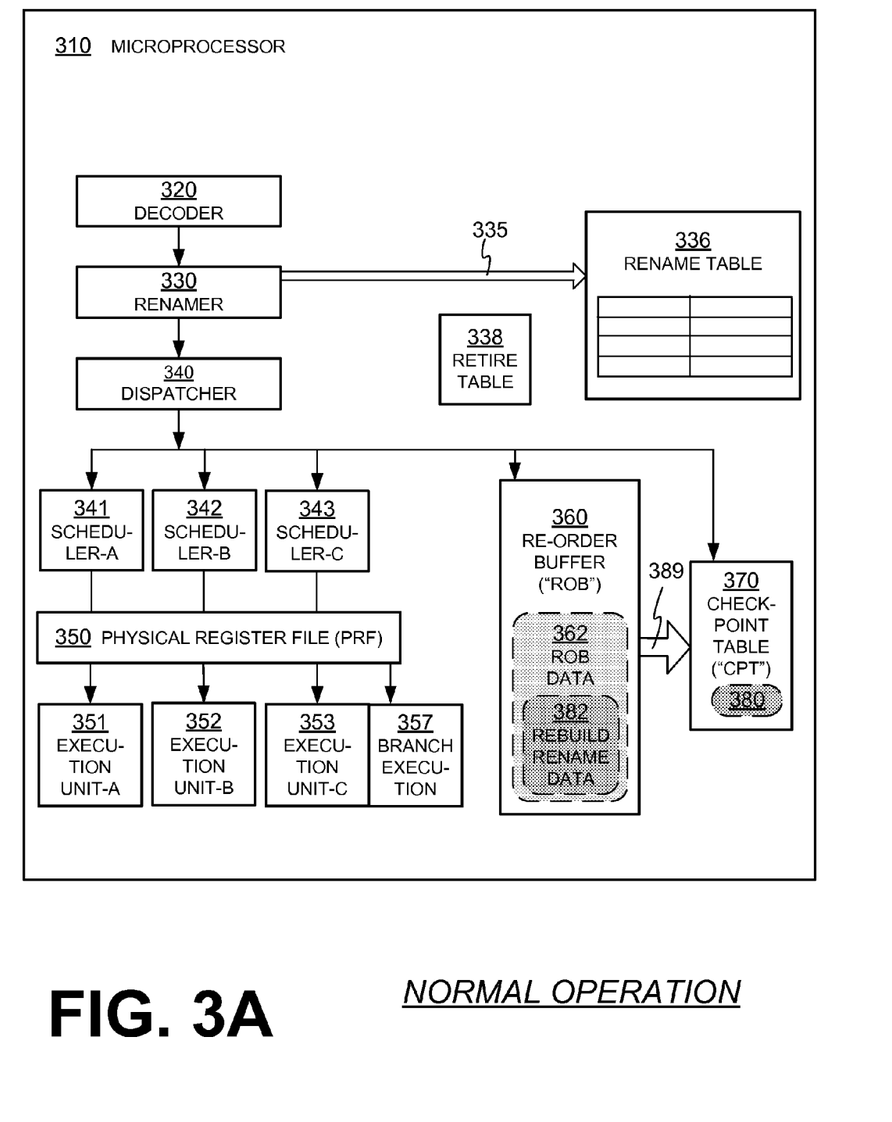
FIG. 3A is a block diagram that show a microprocessor made according to example embodiments, as it operates normally.
Figure 3B:
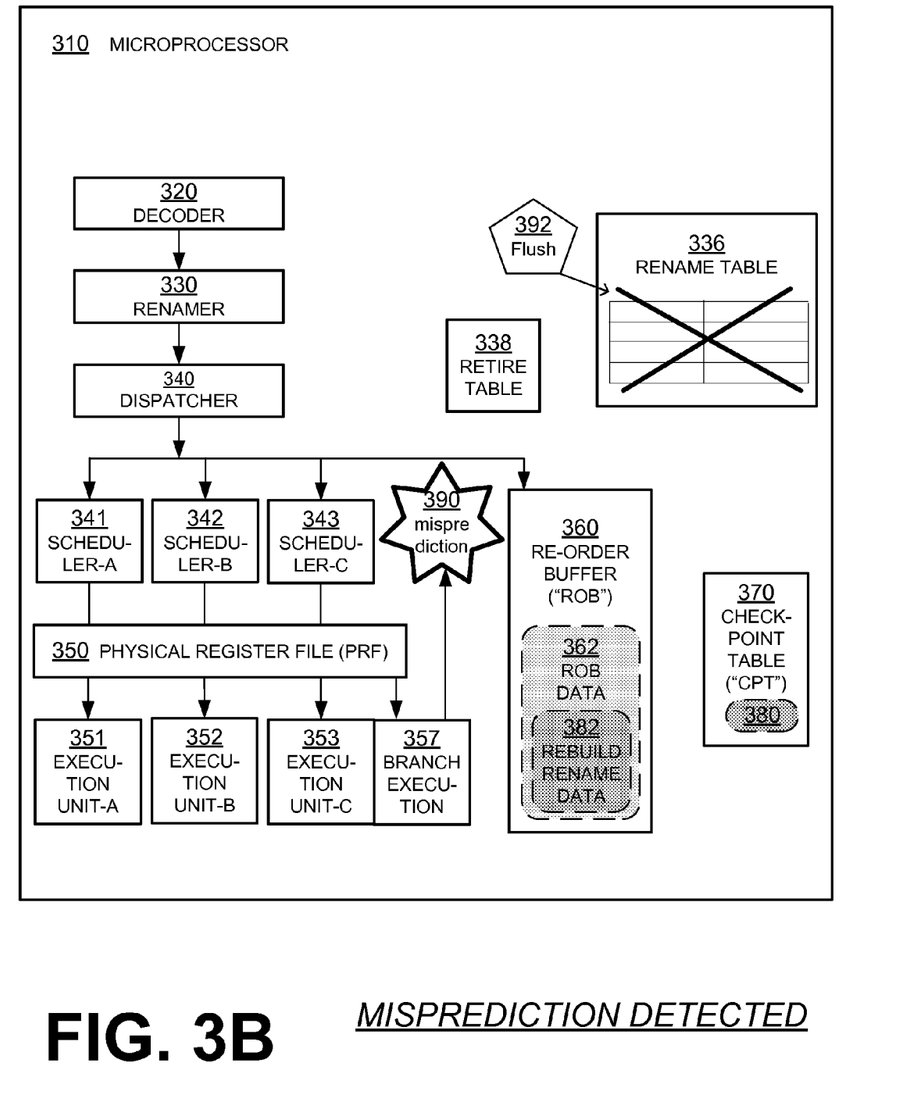
FIG. 3B is a diagram of the microprocessor of FIG. 3A that shows a rename table being flushed after operating normally, the flushing being a result of detecting a misprediction in which instructions to execute.
Figure 3C:
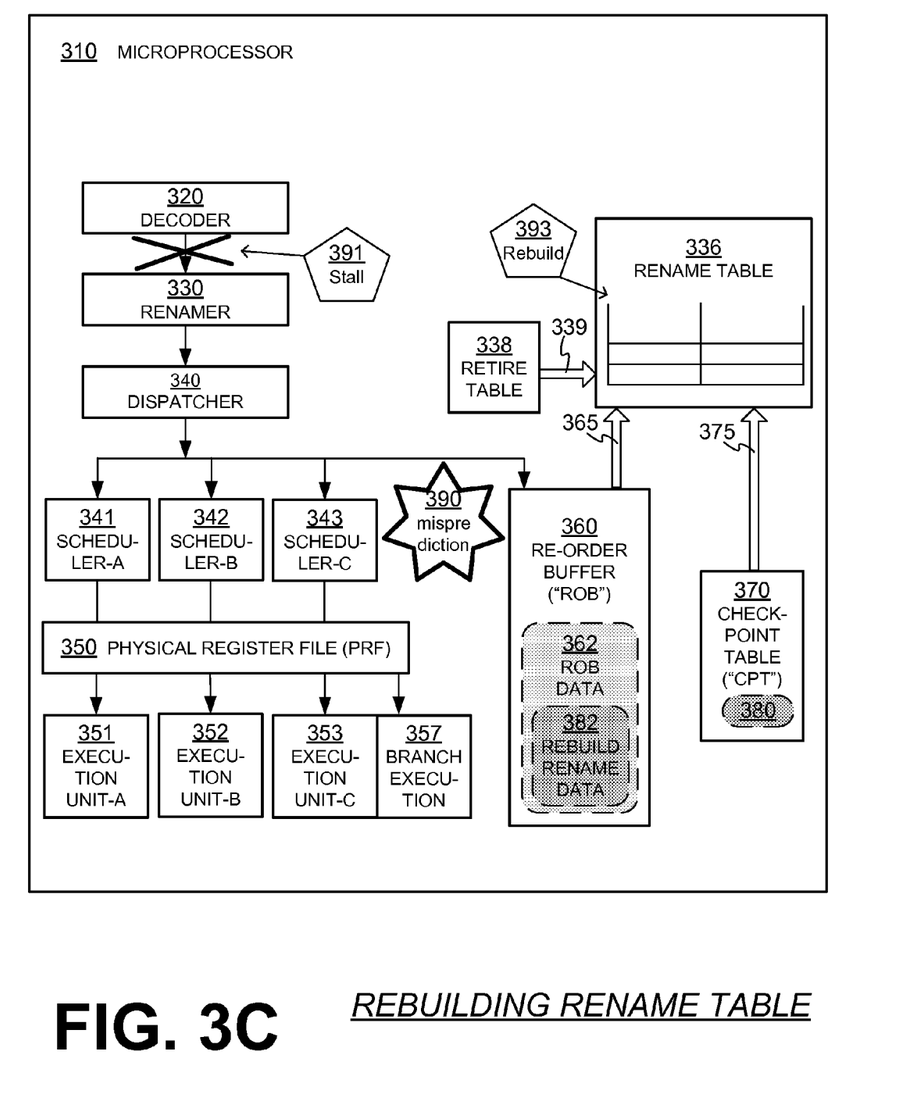
FIG. 3C is a diagram of the microprocessor of FIG. 3B that shows a rename table being rebuilt after being flushed.

FIGS. 3A, 3B, 3C are now used in succession, to describe a sample sequence of events for a sample microprocessor 310 made according to embodiments. Microprocessor 310 includes a decoder 320, a renamer 330, a rename table 336, a retire table 338, a dispatcher 340, schedulers 341, 342, 343, a PRF 350, execution units 351, 352, 353, branch execution logic 357, and a ROB 360, which all can be as described above with reference to similar components in FIG. 1. ROB 360 stores ROB data 362 similar to ROB data 162. ROB data 362 includes rebuild rename data 382, similarly to rebuild rename data 182.

In addition, microprocessor 310 includes a CPT 370 that has a dynamic relationship with ROB 360. CPT 370 and ROB 360 could have the same dynamic relationship as relationship 187 of FIGS. 1, 2A, 2B. CPT 370 stores check-pointed rename data 380 according to the dynamic relationship.

In FIG. 3A, microprocessor 310 operates normally. Instructions are received in decoder 320, pass through the pipe, and are executed at execution units 351, 352, 353.

In FIG. 3B a misprediction is detected, as indicated by flag 390. As a result, rename table 336 is flushed, indicated by comment 392.

In FIG. 3C, rename table 336 is being rebuilt, as indicated by comment 393. As a result, there is a stall in the front end of the pipe, indicated by comment 391.

Rebuilding takes place as follows: First, a retire checkpoint is copied from retire table 338 according to arrow 339. Then, rebuilding is by data that generally come from two different sources. Check-pointed rename data 380 is copied according to arrow 375, if permitted by an aspect of the applicable dynamic relationship. Plus, rebuild rename data 382 is copied by walking ROB 360 according to arrow 365. In some particular cases, however, one of these two sources might not contribute, as will be seen in sample scenarios below.

Microprocessor 310 also typically includes a clock, which is not shown. The clock outputs pulses that define clock cycles. The clock cycles are a good way for measuring the advantages of the invention. Examples are now described.

Figure 4:
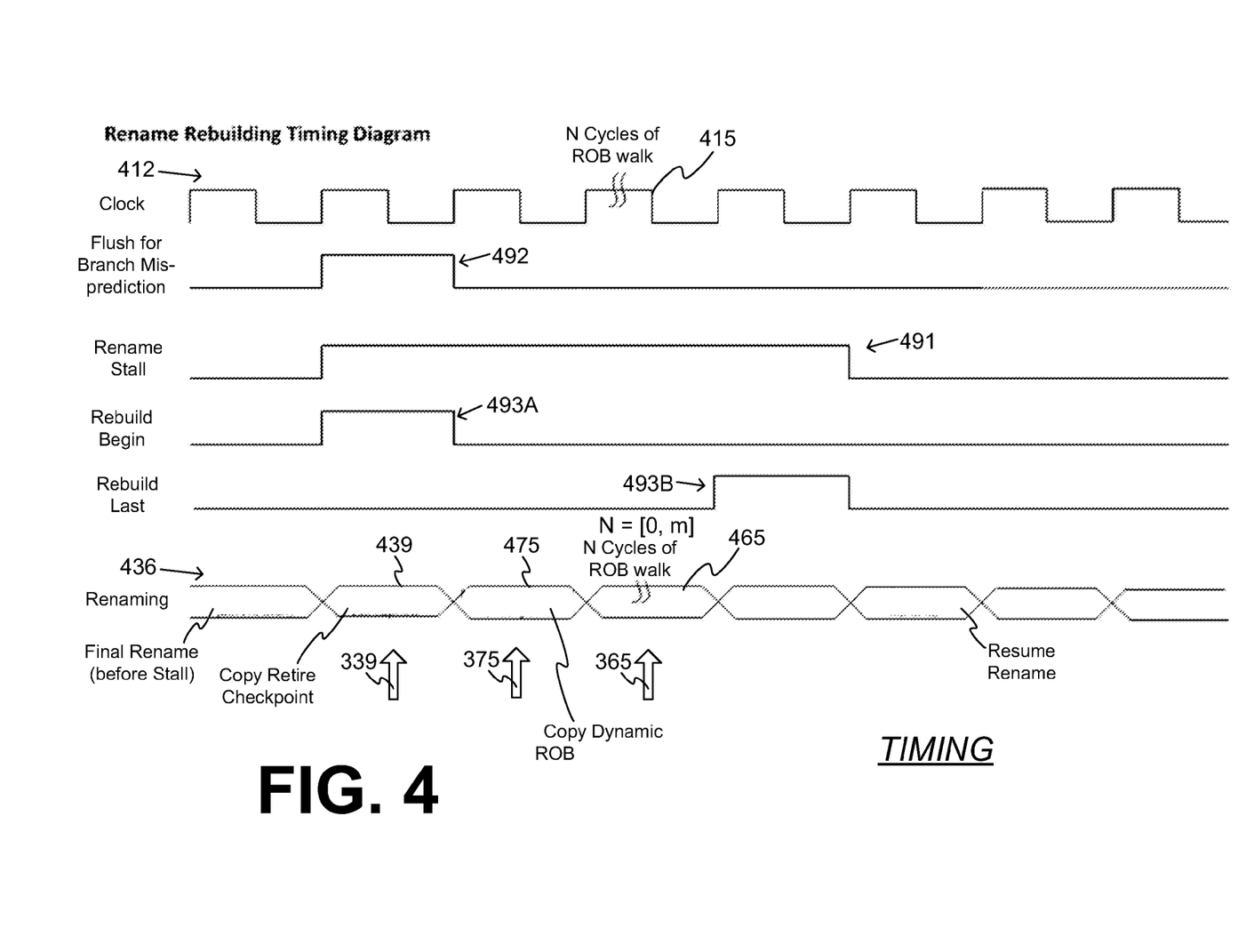
FIG. 4 is a timing diagram, showing relative timing pulses for rebuilding a rename table, such as the rename table of FIG. 3C, according to embodiments.

FIG. 4 is a timing diagram, showing relative timing pulses for rebuilding a rename table, such as in FIG. 3C. Clock cycles 412 include a group 415 of N cycles, here shown as a single pulse. The number N is described later in more detail.

FIG. 4 illustrates an incidence of detecting a misprediction, and the subsequent penalties. A pulse 492 corresponds to flushing rename table 336 per comment 392. A prolonged stalling pulse 491 corresponds to the time that the pipe is stalled, per comment 391; the duration of pulse 491 is related to the time penalty for the misprediction, and the subsequent degradation in performance of the microprocessor. The penalty is larger if N is large, both in pulse 491 and also in group of cycles 415. Pulses 493A and 493B indicate the beginning and the ending of the rebuilding, corresponding to comment 393.

In general, renaming cycles 436 include a) a cycle 439 for copying the retire checkpoint as per operation 339, b) a cycle 475 for concurrent copying from a CPT according to arrow 375, and c) a group 465 of as many as N cycles for walking the ROB as per arrow 365. Similarly to group of cycles 415, cycle 465 is shown as a single one, while in fact both take the value of N. Icons of arrows 339, 375 and 365 are repeated in FIG. 4, at places that will enhance the mental association for the reader.

In particular, however, some of these renaming cycles 436 are not included every time. The question of which ones are included, and which ones not, depends on the scenario that is defined at the moment a misprediction is detected, and the rename table is therefore flushed. Specific operational scenarios are presented now in this document, and are referenced to FIG. 4.

First, for purposes of understanding the scenarios, it should be recognized that a ROB rebuild window becomes defined when the rename table is flushed. The ROB rebuild window has ROB entries starting from the Retire Pointer and ending one prior to the Flush Pointer, as was already seen above in FIG. 2A and FIG. 2B. It is the ROB entries within the ROB rebuild window that define which data needs to be restored to the rename table, whether by concurrent copying from the CPT, or by walking the ROB. In either case, the portion of the rebuild rename data being copied from the ROB to the rename table is within the ROB rebuild window.

The scenarios are different in that, each time the rename table is flushed, the ROB rebuild window will generally be encompassing a different set of ROB entries. As such, the different scenarios explore how the ROB rebuild window has different sizes relative to the depth of the previously mentioned ROB checkpoint window. It is also this aspect in the following sample scenarios that will determine whether or not the CPT table is permitted to be concurrently copied to the rename table, or instead the same contents will be copied by walking the ROB.

Examples of various such scenarios are now explored. For the purpose of these scenarios it is assumed that ROB 360 and CPT 370 are used, similarly with what is shown in FIGS. 2A, 2B. In addition, a dynamic relationship 587 similar to relationship 287 also applies, indicated by the brackets shown for the ROB checkpoint (CP) window and CPT 370.

Figure 5:
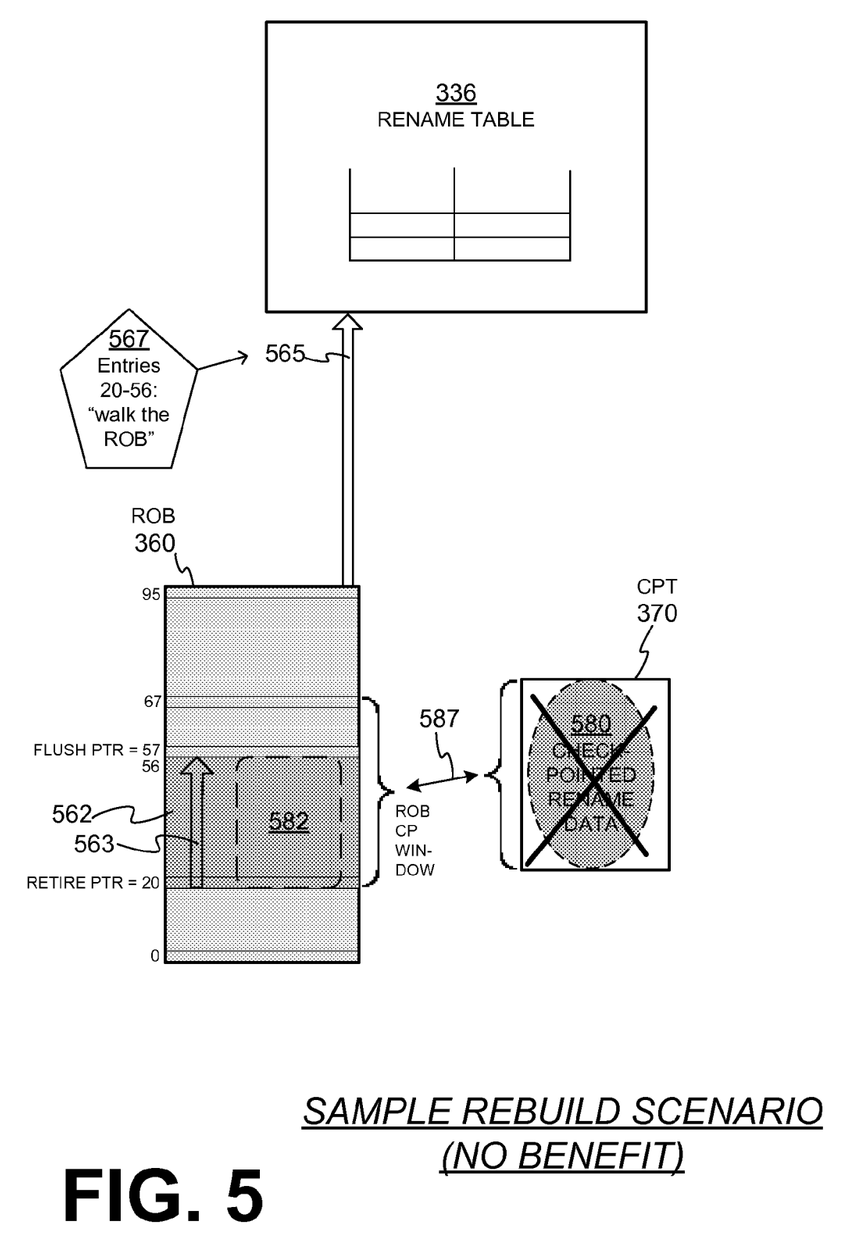
FIG. 5 is a diagram of the components of FIG. 3C, for a first sample scenario where no benefit results from the invention.

FIG. 5 is a diagram of components of FIG. 3C, for a first sample scenario where no benefit results from the invention. In ROB 360 the checkpoint window starts from ROB entry 20, pointed to by the Retire Pointer, and ends at ROB entry 67. In addition, a ROB rebuild window 563, designated by an arrow, starts from ROB entry 20, pointed to by the Retire Pointer, and ends at ROB entry 56, which is one less than ROB entry 57 that is pointed to by the Flush Pointer. ROB data 562 within ROB rebuild window 563 includes rebuild rename data 582, which is to be restored to rename table 336, whether by concurrent copying from CPT 370, or directly by walking ROB 360.

In this example, ROB rebuild window 563 is smaller than the ROB checkpoint window. Accordingly, the contents of ROB entries 57-67 would be flushed, and therefore check-pointed rename data 580 stored in CPT 370 will not be copied into rename table as part of the rebuilding process, since the whole CPT 370 would have to be copied to rename table 336. That is why check-pointed rename data 580 is shown crossed out. Thus, per comment 567, rebuild rename data 582 in all ROB entries 20-56 will be restored according to arrow 565, i.e. by walking ROB 360.

In other words, the CPT of FIG. 5 cannot be used for rebuilding, and thus the invention offered no advantage in the scenario of FIG. 5. Referring briefly to FIG. 4 for the scenario of FIG. 5, rename cycle 475 would be included, and the number N takes a value up to m, where m is the maximum number of steps that ROB 360 could be walked under such a scenario. The duration of stalling pulse 491 is not diminished from what it would be without the invention. Such is not true with the remaining example scenarios.

Figure 6:
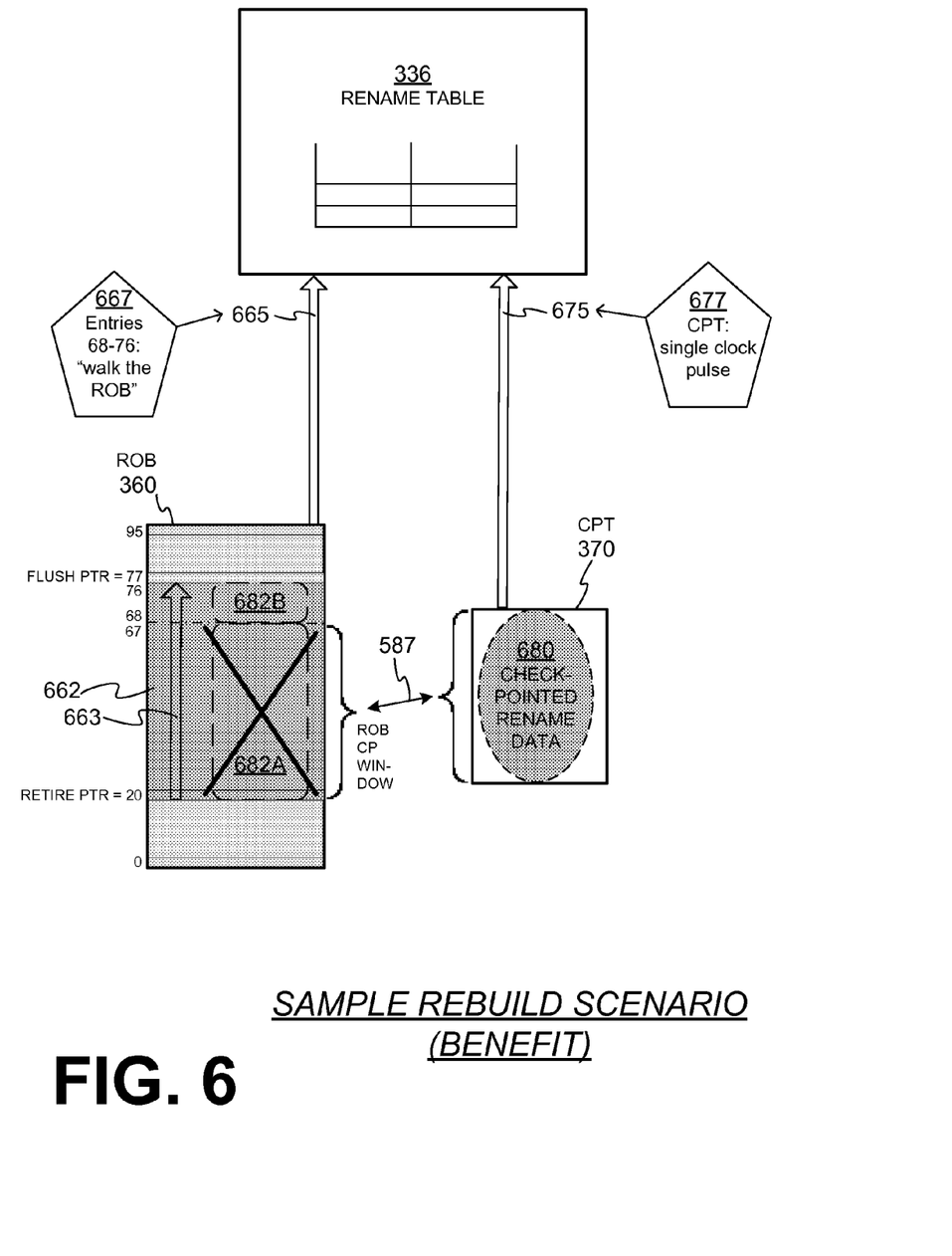
FIG. 6 is a diagram of the components of FIG. 3C, for a second sample scenario where benefit results from the invention.

FIG. 6 is a diagram of components of FIG. 3C for a second sample scenario. In ROB 360 the checkpoint window starts from ROB entry 20, pointed to by the Retire Pointer, and ends at ROB entry 67. In addition, a ROB rebuild window 663 within ROB 360 spans ROB entries 20-76. In this example, ROB rebuild window 663 is larger than the ROB checkpoint window. Within ROB rebuild window 663, ROB data 662 includes rebuild rename data portions 682A and 682B, which is to be restored to rename table 336. It will be appreciated that the division of the rebuild rename data into portions 682A and 682B within ROB 360 arises from the boundaries of the ROB checkpoint window. Indeed, ROB entries 20-67 map into check-pointed rename data portion 680 stored in CPT 370, while ROB entries 68-76 do not map into CPT 370 at all.

Check-pointed rename data portion 680 is useable and, per comment 677, it will be restored according to arrow 675. Accordingly, rebuild rename data portion 682A will not be needed, and is shown crossed out. However, portion 682B cannot be copied efficiently via a CPT and, per comment 667, rebuild rename data portion 682B in ROB entries 48-54 will be restored according to arrow 665, by walking ROB 360. With reference to FIG. 4, restoring according to arrow 675 can take place in a single clock pulse 475. N will still be larger than zero, but less than m, and the duration of stalling pulse 491 will be diminished due to the invention. It will be observed that rebuilding in the scenario of FIG. 6 requires copying more data than in that of FIG. 5, but needs less time thanks to the invention.

Figure 7:
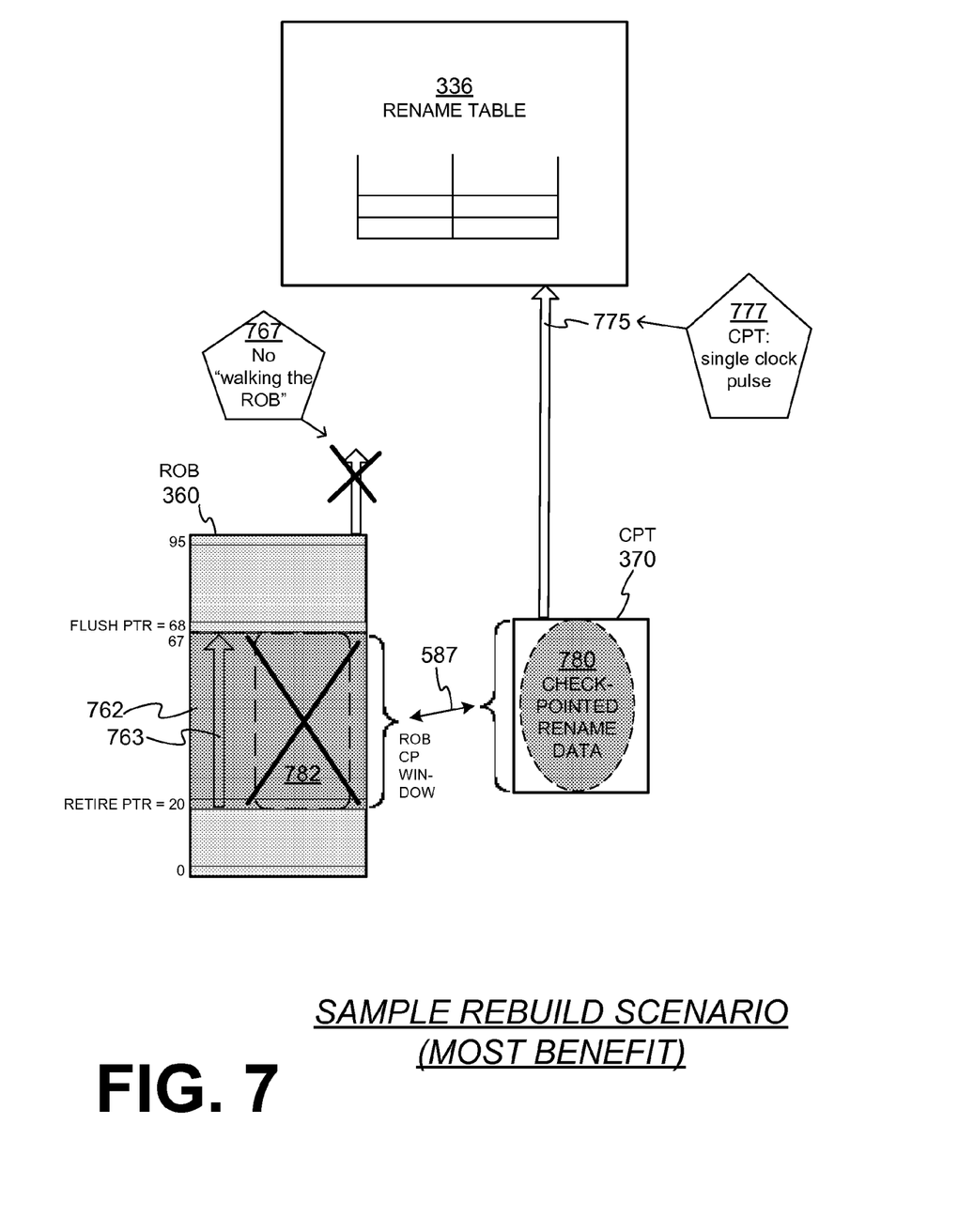
FIG. 7 is a diagram of the components of FIG. 3C, for a third sample scenario, where a maximum benefit results from the invention.

FIG. 7 is a diagram of components of FIG. 3C for a third sample scenario. In ROB 360 the checkpoint window starts from ROB entry 20, pointed to by the Retire Pointer, and ends at ROB entry 67. In addition, a ROB rebuild window 763 spans ROB entries 20-67. In this example, ROB rebuild window 763 is exactly the same as the ROB checkpoint window. This is a special case, which statistically does happen with some frequency. ROB data 762 includes rebuild rename data 782.

Check-pointed rename data 780 is useable and, per comment 777, it will be restored according to arrow 775. Moreover, per comment 767, there will be no walking ROB 360 in this scenario; no rebuild rename data will be copied from ROB 360 to rename table 336. Accordingly, rebuild rename data 782 will not be needed, and is shown crossed out. With reference to FIG. 4, restoring according to arrow 775 can take place in a single clock pulse 475. N will be zero, and there will be no group of pulses 415, 465. The duration of stalling pulse 491 will be minimized due to the invention.

Figure 8:
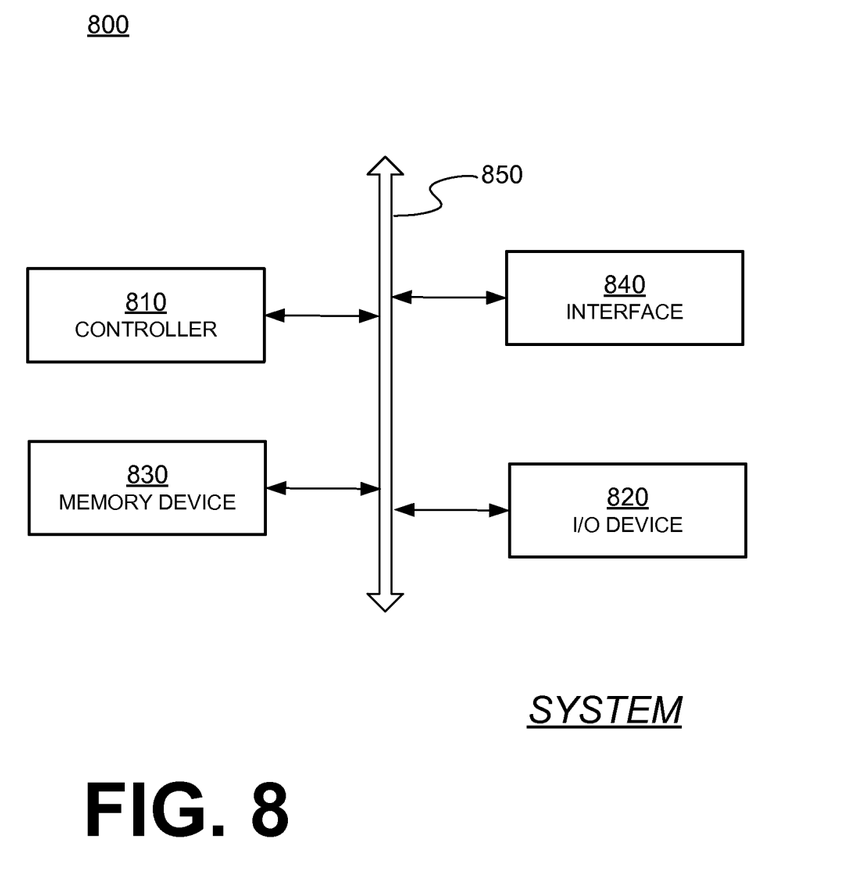
FIG. 8 is a block diagram for illustrating a system that includes a microprocessor according to example embodiments.

Referring to FIG. 8, an electronic device includes a system 800 that works with a semiconductor device according to example embodiments. System 800 may be used in one of a personal digital assistant (PDA), a laptop computer, a mobile computer, a web tablet, a wireless phone, a cell phone, a digital music player, a wired or wireless electronic device, or a complex electronic device including at least two ones thereof. System 800 may include a controller 810, an input/output device 820 such as a keypad, a keyboard, a display, a memory 830, and an interface 840 that communicate with each other through a bus 850. Controller 810 may include, for example, at least one microprocessor made according to embodiments, a digital signal processor, a microcontroller or the like. Memory 830 may be configured to store instructions to be used by the controller 810, and/or a user data that is accessible via the I/O device. Electronic device 800 may use interface 840 configured to transmit data to or receive data from a communication network. The transmission can be via wires, for example via cables, or USB interface. Alternately, the communication network can be wireless, and interface 840 can be wireless and include, for example, an antenna, a wireless transceiver and so on. Electronic system 800 may be used in a communication interface protocol of a communication system such as CDMA, GSM, NADC, E-TDMA, WCDMA, CDMA2000, Wi-Fi, Muni Wi-Fi, Bluetooth, DECT, Wireless USB, Flash-OFDM, IEEE 802.20, GPRS, iBurst, WiBro, WiMAX, WiMAX-Advanced, UMTS-TDD, HSPA, EVDO, LTE-Advanced, MMDS, and so forth.

Figure 9:
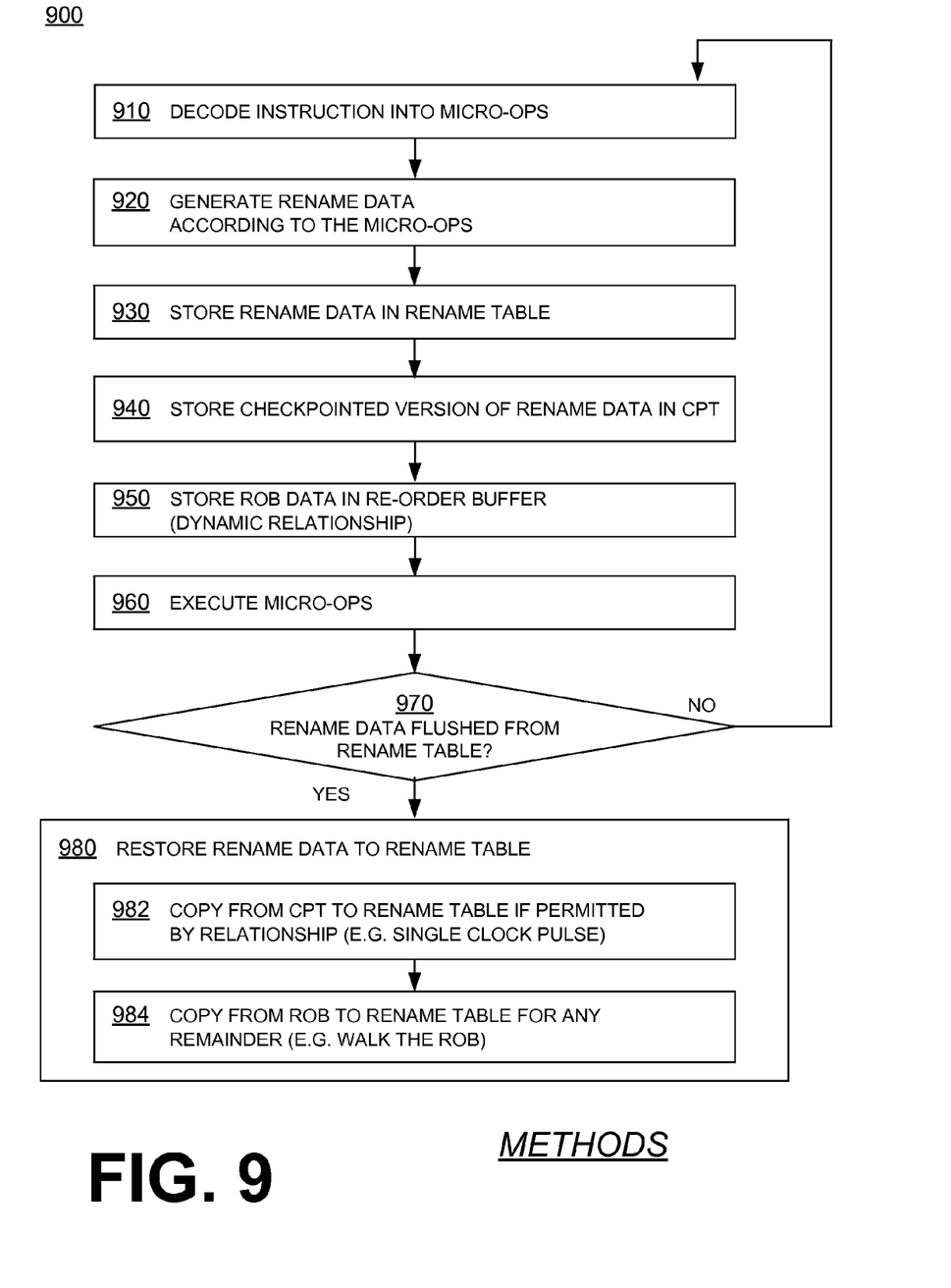
FIG. 9 is a flowchart for illustrating methods according to example embodiments.

FIG. 9 shows a flowchart 900 for describing methods according to embodiments. The methods of flowchart 900 may also be practiced by embodiments described above, like microprocessors and electronic devices.

According to an operation 910, an instruction is decoded into micro-ops. According to a next operation 920, rename data is generated according to the micro-ops. According to a next operation 930, the rename data is stored in a rename table.

According to a next operation 940, a check-pointed version of the rename data is stored in a CPT. According to another operation 950, ROB data is stored in a ROB, which has been generated from the micro-ops. The ROB data includes rebuild rename data, which can be used for ultimately rebuilding the rename table, if need be. The ROB maintains a dynamic relationship with the CPT. According to an operation 960, the micro-ops are executed.

According to a next operation 970, it is determined whether the rename table has been flushed; in other words, the rename data has been flushed from the rename table. If not, execution resumes to operation 910 above. In some embodiments, the rename table has been flushed responsive to detecting a misprediction as per the above.

If the rename table has been flushed, then according to a next operation 980, rename data is restored to the rename table; in other words, the rename table is rebuilt. Operation 980 includes one or both of operations 982 and 984. For operation 980, a ROB rebuild window of ROB entries can become defined, when the rename table is flushed; it is the rebuild rename data of these ROB entries within the ROB rebuild window that are restored to the rename table, whether by operation 982, or by operation 984.

According to operation 982, the check-pointed version of the rename data is copied from the CPT to the rename table, if permitted by the relationship of operation 950. In some embodiments, the check-pointed version of the rename data is so copied in a single clock cycle.

According to operation 984, rebuild rename data is copied from the ROB to the rename table. Preferably, that is done for any remainder not covered by operation 982, and is done by walking the ROB.

In the above, the order of operations is not constrained to what is shown, and different orders may be possible according to different embodiments. In addition, in certain embodiments, new operations may be added, or individual operations may be modified or deleted.

A person skilled in the art will be able to practice the present invention in view of this description, which is to be taken as a whole. Details have been included to provide a thorough understanding. In other instances, well-known aspects have not been described, in order to not obscure unnecessarily the present invention.

This description includes one or more examples, but that does not limit how the invention may be practiced. Indeed, examples or embodiments of the invention may be practiced according to what is described, or yet differently, and also in conjunction with other present or future technologies.

The following claims define certain combinations and subcombinations of elements, features and steps or operations, which are regarded as novel and non-obvious. Additional claims for other such combinations and subcombinations may be presented in this or a related document.

What is claimed is:

1. A microprocessor, comprising:
a decoder for decoding an instruction into micro-operations;
an execution unit for executing the micro-operations;
a renamer for generating rename data according to the micro-operations;
a rename table for storing the rename data, wherein the rename table is configured to flush the rename data from the rename table;
a re-order buffer having re-order buffer entries for storing re-order buffer data generated from the micro-operations and a retire pointer pointing to a variable one of the re-order buffer entries, the re-order buffer data including rebuild rename data; and
a check-point table including check-point entries, wherein each check-point entry is configured to store a check-pointed version of the rename data, and wherein each check-point entry is dynamically associated with a respective re-order buffer entry number in a contiguous value sequence in the re-order buffer, wherein the check point table is determined dynamically based on a re-order buffer entry number pointed by the retire pointer when a checkpoint event occurs; and
wherein the retire pointer at the checkpoint event and a size of the check-point table define a re-order buffer checkpoint window;
in which if rename data stored in the rename table is flushed from the rename table, the flushed rename data can be restored to the rename table by:
the check-pointed version of the rename data being copied from the check-point table to the rename table if a re-order buffer rebuild window includes an end of the re-order buffer checkpoint window, plus
if re-order buffer rebuild window is larger than the re-order buffer checkpoint window, at least a portion of the rebuild rename data in the ROB rebuild window being copied from the ROB to the rename table.

2. The microprocessor of claim 1, further comprising:
a dispatcher for dispatching the micro-operations to the execution unit, and
in which the check-point table receives the check-pointed version of the rename data from the dispatcher.

3. The microprocessor of claim 1, further comprising:
branch execution logic for detecting a misprediction in executing the micro-operations, and
in which responsive to a misprediction being detected, the rename data is flushed from the rename table.

4. The microprocessor of claim 1, further comprising:
a clock for outputting pulses that define clock cycles, and
in which the check-pointed version of the rename data is copied from the check-point table to the rename table in a single one of the clock cycles.

5. A microprocessor, comprising:
a renamer for generating rename data according to micro-operations;
a rename table for storing the rename data;
a re-order buffer for storing re-order buffer data generated from the micro-operations, the re-order buffer data including rebuild rename data stored in re-order buffer entries; and
a check-point table for storing a check-pointed version of the rename data in a plurality of check-point entries, wherein each check-point entry is dynamically associated with a respective re-order buffer entry number in a contiguous value sequence in the re-order buffer, wherein the check-point table is determined dynamically based on a re-order entry number pointed by a retire pointer when a checkpoint event occurs, and
in which if rename data stored in the rename table is flushed from the rename table, the flushed rename data is restored by:
if permitted by the dynamic association, the check-pointed version of the rename data being copied from the check-point table to the rename table, and
but, if the flushed data is fully restored by the check-point table, without any portion of the rebuild rename data being copied from the re-order buffer to the table.

6. The microprocessor of claim 5, further comprising:
a dispatcher for dispatching the micro-operations to an execution unit, and
in which the check-point table receives the check-pointed version of the rename data from the dispatcher.

7. The microprocessor of claim 5, further comprising:
branch execution logic for detecting a misprediction in an execution of the micro-operations, and
in which the rename table is so rebuilt responsive to a misprediction being detected.

8. The microprocessor of claim 5, further comprising:
a clock for outputting pulses that define clock cycles, and
in which the check-pointed version of the rename data is copied from the check-point table to the rename table in a single one of the clock cycles.

9. An apparatus comprising:
a rename table configured to store rename data associated with a plurality of renamed registers;
a re-order buffer comprising:
a plurality of re-order buffer entries, wherein each re-order buffer entry is configured to store at least on piece of re-order data, and
a retire pointer indicating a re-order buffer entry that, in part, defines a reorder buffer checkpoint window and indicates a new re-order buffer entry as micro-operations retire; and
a check-point table comprising check-point entries, and configured to store a check-pointed version of the rename data and, wherein each check-point entry is dynamically associated with a corresponding one of a subset of the re-order buffer entries, wherein the check-point entry is dynamically associated with a respective re-order buffer entry number in a contiguous value sequence in the re-order buffer, wherein the check-point table is determined dynamically based on a re-order buffer entry number pointed by retire pointer when a checkpoint event occurs;

wherein, if rename data stored in the rename table is flushed from the rename table, the flushed rename data can be restored to the rename table by:
the check-pointed version of the rename data being copied from the check-point table to the rename table if permitted by an aspect of a dynamic association between the check-point entries and the re-order buffer entries, plus
if required by an aspect of the dynamic association correlation between the check-point entries and the re-order buffer entries, at least a portion of the rename data being rebuilt from the re-order buffer.

10. The apparatus of claim 9, wherein the re-order buffer comprises a re-order buffer rebuild window that includes a at least one re-order buffer entry, and defined as ending at a re-order buffer entry associated with a flush pointer; and wherein the check-pointed version of the rename data of a check-point table is permitted to be copied to the rename table if a last check-point entry of the check-point table is associated with a re-order buffer entry included within the re-order buffer rebuild window.

11. The apparatus of claim 9, wherein copying the check-pointed version of the rename data from the check-point table to the rename table is accomplished within one clock cycle; and
wherein copying at least a portion of the rename data from the re-order buffer to the rename table is accomplished within multiple clock cycles.

12. The apparatus of claim 9, wherein a current re-order buffer entry that is indicated by the Restore pointer when the flushed rename data is restored is not the same as a prior re-order buffer entry that is indicated by the retire pointer when a checkpoint event occurs.

13. The apparatus of claim 9, wherein copying the rename data from the check-point table to the rename table is permitted if an end of the reorder buffer checkpoint window exceeds or equals an end of a reorder buffer rebuild window, regardless of whether a start of the reorder buffer checkpoint window exceeds a start of the reorder buffer rebuild window; and
wherein the reorder buffer checkpoint window is defined by a current version of the dynamic association between each check-point entry and the corresponding one Re-order Buffer entry.

14. The apparatus of claim 9, wherein the check-point table comprises less check-point entries than a number of re-order buffer entries comprised by the re-order buffer.

15. The apparatus of claim 14, wherein the check-point table comprises one-half a number of check-point entries than a number of re-order buffer entries comprised by the re-order buffer.

16. The apparatus of claim 9, wherein copying the check-pointed version of the rename data from the check-point table to the rename table is accomplished within a fixed number of one or more clock cycles; and
wherein rebuilding at least a portion of the rename data from the re-order buffer is accomplished within a variable number of clock cycles.

17. The microprocessor of claim 1, wherein the re-order buffer comprises a re-order buffer rebuild window defined as ending at a re-order buffer entry associated with a Flush Pointer.

18. The microprocessor of claim 1, wherein the check-point table comprises one-half a number of check-point entries than a number of re-order buffer entries comprised by the re-order buffer.

19. The microprocessor of claim 5, wherein the re-order buffer comprises a re-order buffer rebuild window that includes a at least one re-order buffer entry; and
wherein the check-pointed version of the rename data of a check-point table is permitted to be copied to the rename table if a last check-point entry of the check-point table is associated with a re-order buffer entry included within the re-order buffer rebuild window.

20. The microprocessor of claim 5, wherein the flushed rename data is restored by, if the flushed data is not fully restored by the check-point table, restoring a portion of the rebuild rename data from the re-order buffer.

* * * * *